US006467397B1

(12) United States Patent
Fuchs et al.

(10) Patent No.: US 6,467,397 B1
(45) Date of Patent: Oct. 22, 2002

(54) CONSTRUCTED PISTON OR PISTON CONSISTING OF COMPONENTS THAT ARE WELDED OR SOLDERED TOGETHER

(75) Inventors: Reinhold Fuchs, Fellbach (DE); Dietmar Zaiser, Fellbach (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 09/889,654

(22) PCT Filed: Jan. 4, 2000

(86) PCT No.: PCT/DE00/00094

§ 371 (c)(1),
(2), (4) Date: Jul. 19, 2001

(87) PCT Pub. No.: WO00/43661

PCT Pub. Date: Jul. 27, 2000

(30) Foreign Application Priority Data

Jan. 20, 1999 (DE) ........................................ 199 02 144

(51) Int. Cl.[7] ................................................ F16J 1/04
(52) U.S. Cl. ...................................................... 92/231
(58) Field of Search ........................... 92/222, 224, 231

(56) References Cited

U.S. PATENT DOCUMENTS 1,466,786 A * 9/1923 Brynteson ................. 92/224 X
1,686,357 A * 10/1928 Williams .................. 92/224 X
2,026,611 A * 1/1936 Chase ......................... 92/224
2,244,008 A 6/1941 Hazen et al. ............. 92/231 X

FOREIGN PATENT DOCUMENTS

| | | |
|---|---|---|
| DE | 29 14 456 | 10/1980 |
| DE | 30 32 671 | 3/1982 |
| DE | 44 16 120 | 11/1995 |
| FR | 748 101 | 6/1933 |
| GB | 2 153 964 | 8/1995 |
| JP | 07293326 | 7/1995 |
| JP | 09004464 | 7/1997 |
| JP | 09096247 | 8/1997 |

* cited by examiner

*Primary Examiner*—John E. Ryznic
(74) *Attorney, Agent, or Firm*—Collard & Roe, P.C.

(57) ABSTRACT

A constructed piston 1 is comprised of an upper part 2 produced from forged steel, and a bottom part 3, said parts being joined with the expansion screws 4. The bottom part 3 consists of a forged part 6 produced from steel, with the bosses 7 and an approximately tubular shaft extension 5 consisting of an iron material, said extension being joined with the part 6 by welding. In the lower zone of the shaft extension 5, the latter has a collar 8 that can be worked for the purpose of adjusting a piston weight within the tolerance range.

2 Claims, 2 Drawing Sheets

Figure 1:
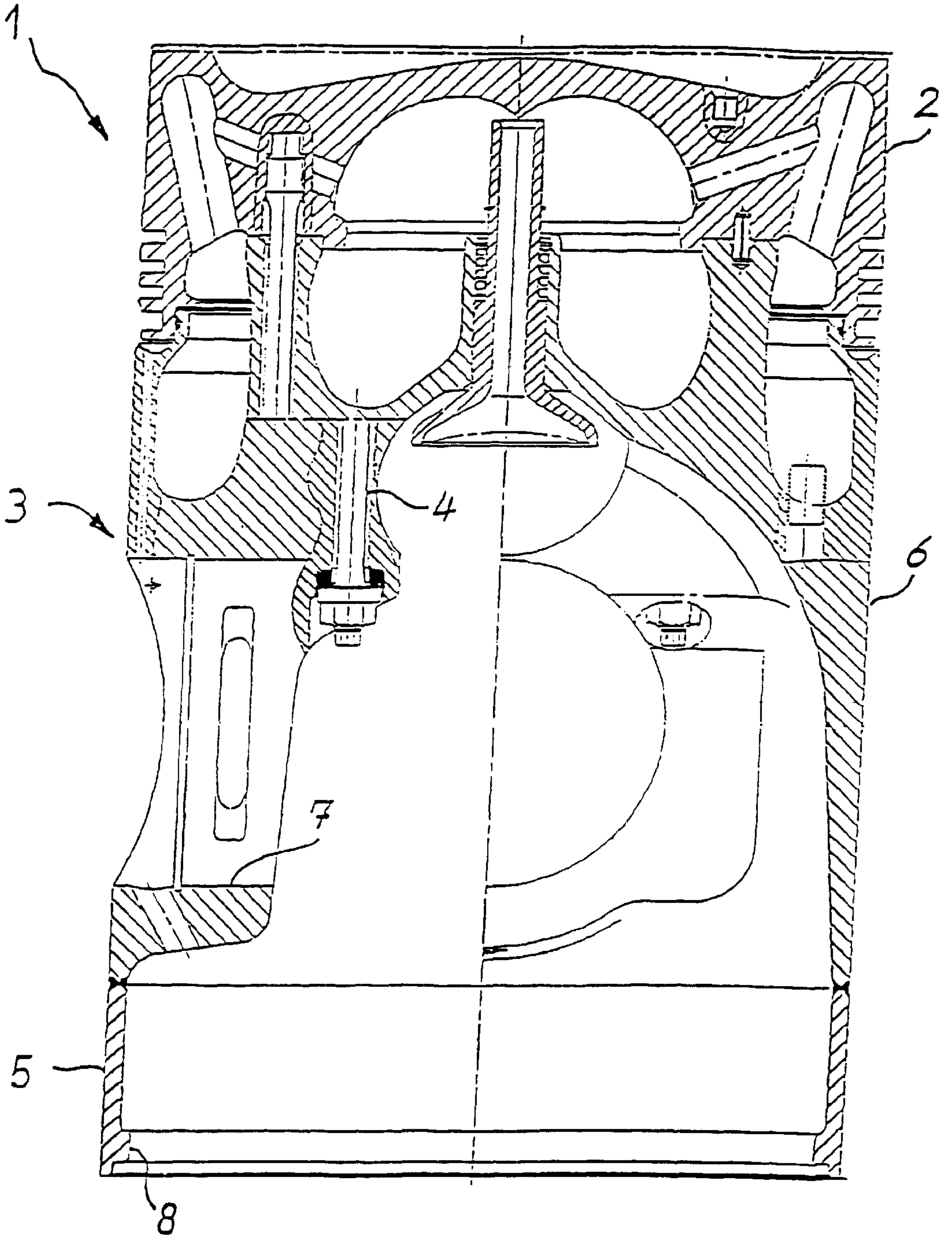

CONSTRUCTED PISTON OR PISTON CONSISTING OF COMPONENTS THAT ARE WELDED OR SOLDERED TOGETHER

CROSS REFERENCE TO RELATED APPLICATIONS

Applicants claim priority under 35 U.S.C. §119 of German Application No. 199 02 144.9, filed on Jan. 20 1999. Applicants also claim priority under 35 U.S.C. §120 of PCT/DE00/00094, filed on Jan. 4, 2000. The international application under PCT article 21 (2) was not published in English.

The invention relates to a constructed piston comprising an upper part produced from steel and a lower part produced from an iron material, as defined in the introductory part claim 1, or to a piston made of iron material that is comprised of at least two components that are joined with one another by welding or soldering techniques.

With the pistons produced from iron material as they are known heretofore, the lower part or the entire piston is made of cast iron, as a rule.

Furthermore, a piston is known from DE 30 32 671 A in connection with which the upper part of the piston consists of heat-resistant steel and the lower part of the piston of flow-pressed steel, and the upper and lower parts of the piston are joined with one another by welding or soldering. Said piston, however, has remained the state of the art on paper only.

More recent constructions dispense with the use of cast iron materials and, in selecting the material for iron pistons or for the lower parts of pistons, have changed to forged steel because casting defects, which never can be totally excluded, may lead to damage in connection with increased ignition pressures.

However, forged lower parts and pistons produced in the form of one single part from forged steel, pose the problem that the manufacture of long shafts is difficult in terms of forging technology. The forgeability of a component depends on the depth to which the forging die is pressed in, and upon the taper slants. The required taper slants, on the other hand, led to unnecessarily high thickness of the wall of the shaft. In order to avoid this, the lower edge of the shaft is provided with a relatively thin wall. This leads to the fact that the end of the shaft tends to vibrate as it is being worked.

Therefore, the invention is dealing with the problem of producing bottom parts or pistons forged from steel with an adequately long shaft in a simple manner.

Said problem is solved with the piston as defined above by an embodiment with the characterizing feature of claim 1 or 2.

Particularly friction welding or MAG-welding can be considered as welding methods for connecting the shaft extension with the forged piston or bottom part.

The shrinking on or in is normally carried out by heating or cooling of at least one of the components to be joined.

Furthermore, an advantage of the shaft extension that is welded-on or soldered-on, or of the shaft extension that joined with the piston by shrinking it on, has to be seen in the fact that it is possible to provide a collar on the lower edge of the shaft to serve as weight compensation in order to meet the weight tolerances specified by the engine manufacturer, by reducing the collar by milling. With single-part forged pistons or bottom parts, such a collar leads to excessively large wall thicknesses.

Figure 2:
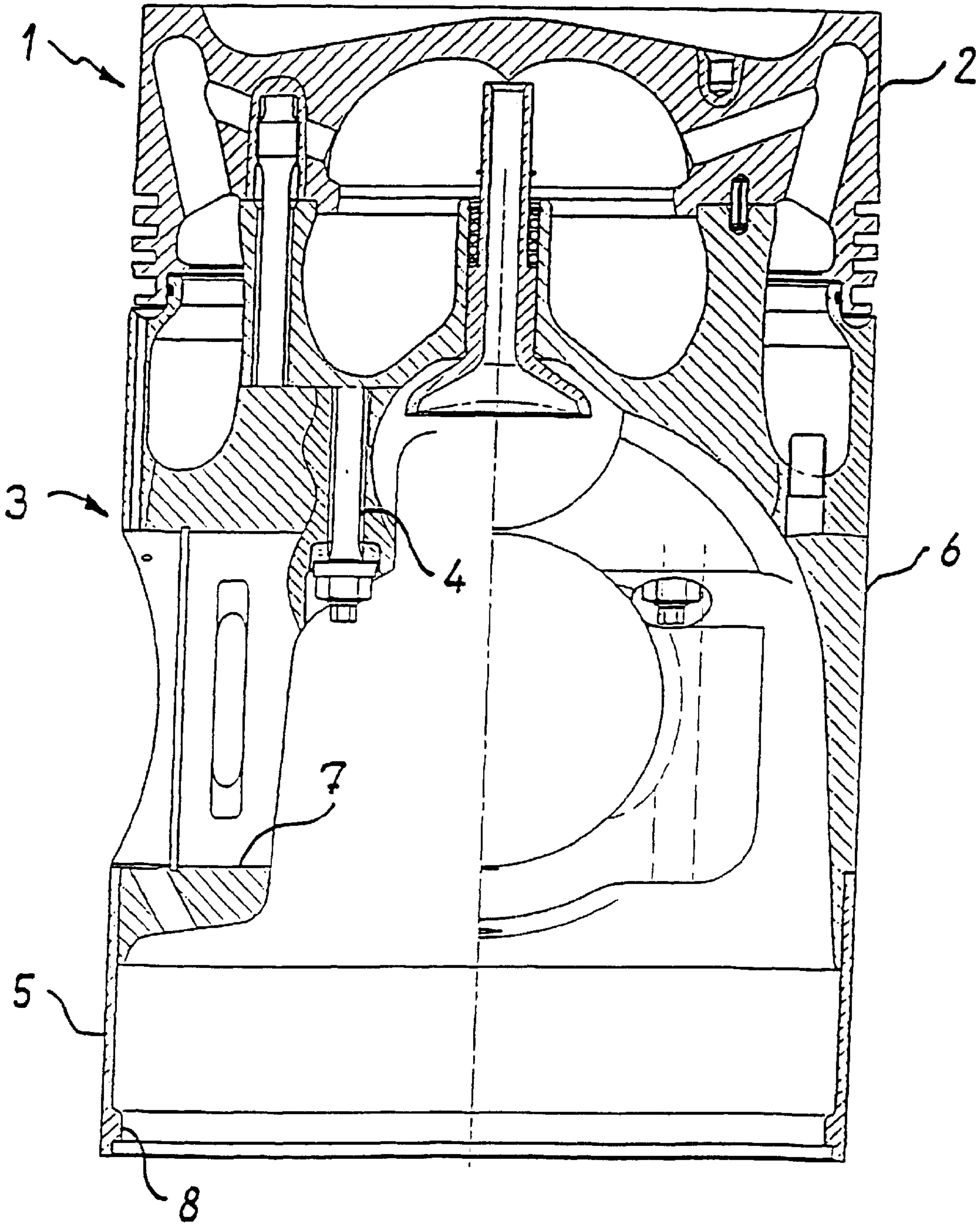

The invention is explained in greater detail in the following with the help of two exemplified embodiments. In the drawing, FIG. 1 shows the cross section of a piston as defined by the invention, cut on the left side in the direction of the bolt, and cut on the right side in the direction of pressure-counterpressure;

FIG. 2 shows a piston as defined by the invention, with the shaft extension shrunk on.

What is claimed is:

1. A piston produced from iron material and comprising at least two parts connected with each other by welding or soldering, characterized in that it consists of forged steel at least within the area of the piston head and the bosses, and that below the bosses (7) it has a shaft extension made of an iron material, said shaft extension approximately having the outside diameter of the iron piston at least in the direction of presssure-counterpressure, and being connected with the piston by welding or soldering, or being shrunk onto the piston or into the piston.

2. A constructed piston (1) comprised of an upper part (2) produced from forged steel, and a bottom part (3) made of iron material, said bottom parts consisting of two or more components (5, 6) joined with one another, whereby the one component (6) contains bosses (7), and whereby the upper part (2) and the bottom part (3) are joined with one another by one or more expansion screws (4), characterized in that the bottom part (3) consists of forged steel at least within the area of the bosses, and that below the bosses (7), the bottom part (3) has a shaft extension (5) having approximately the outside diameter of the component (6) at least in the direction of pressure-counterpressure, said shaft extension being joined with the component (6) containing the bosses (7) by welding or soldering, or being shrunk onto the component (6) or into the component (6).

* * * * *